United States Patent [19]

Isaksen

[11] Patent Number: 5,663,730
[45] Date of Patent: Sep. 2, 1997

[54] RADAR SYSTEM FOR TRANSMITTING AND RECEIVING RADAR SIGNALS VIA A COMMON AERIAL

[76] Inventor: Per-Arne Isaksen, Stokkedalslia 109, N-5062 Bønes, Norway

[21] Appl. No.: 446,815

[22] PCT Filed: Dec. 7, 1993

[86] PCT No.: PCT/NO93/00184

§ 371 Date: Oct. 6, 1995

§ 102(e) Date: Oct. 6, 1995

[87] PCT Pub. No.: WO94/14083

PCT Pub. Date: Jun. 23, 1994

[30] Foreign Application Priority Data

Dec. 7, 1992 [NO] Norway ............. 924707

[51] Int. Cl.$^6$ ............................................. G01S 13/93
[52] U.S. Cl. ................................. 342/41; 342/197
[58] Field of Search .................... 342/26, 23, 41, 342/59, 55, 158, 197

[56] References Cited

U.S. PATENT DOCUMENTS

| | | | |
|---|---|---|---|
| 2,817,832 | 12/1957 | Mathes | 343/13 |
| 4,197,540 | 4/1980 | Riggs, et al. | 343/17.2 R |
| 4,206,461 | 6/1980 | Pease et al. | 342/159 |
| 4,890,112 | 12/1989 | Petito et al. | 342/58 |
| 5,191,343 | 3/1993 | Danzer et al. | 342/21 |
| 5,254,999 | 10/1993 | Lee | 342/197 |
| 5,583,511 | 12/1996 | Hulderman | 342/175 |

FOREIGN PATENT DOCUMENTS

0292912  11/1988  European Pat. Off. .

*Primary Examiner*—John B. Sotomayor
*Attorney, Agent, or Firm*—McAulay Fisher Nissen Goldberg & Kiel, LLP

[57] ABSTRACT

The radar system comprises a transmitter unit and a receiving unit for radar signals, a trigger unit for guiding the radar signals from the transmitter unit and an aerial unit for transmitting the radar signals from the transmitting unit and for receiving reflected video signals. The transmitter unit and receiving unit each comprise at least two separate transmitters and receivers. All of the transmitters and receivers are triggered off by a common trigger which is arranged to trigger each individual transmitter mutually in series during a sequence period so that the transmitters produce signals with mutually distinct frequencies/characteristics. The individual receivers are matched to the respective transmitters to be able to present the frequencies/characteristics of video signals in approximately the entire sequence.

12 Claims, 5 Drawing Sheets

RADAR SYSTEM FOR TRANSMITTING AND RECEIVING RADAR SIGNALS VIA A COMMON AERIAL

The present invention relates to a radar system. The invention relates to an improvement of the radar systems as they are known today. More particularly, the invention relates to a radar system for transmitting and receiving radar signals via a common aerial.

The navigational radar of today has not changed essentially for many years. Taking into account that the clarity of the picture has the greatest significance in bad weather, one might be tempted to say that the majority of radar sets are of relatively poorer quality than they were earlier.

Some of the background for this is that when the radar has a specification for a given purpose, one must compromise, i.e. that by providing radar systems one can obtain the required information with the necessary precision, assuming that one is willing to renounce other information, and to accept higher weights, need of space and costs.

It is a known fact that shipping has increased considerably in recent years. Moreover the speed of certain types of vessels, and particularly passenger vessels (catamarans and pleasure crafts etc) has greatly increased. Many of these vessels can reach a speed of up to 60 knots. Taking these facts into consideration, and the increase of speed boats in recent years presents a corresponding need for further development and improvement of radar sets.

During the last ten years there have been many accidents, or near accidents, which can partly be blamed on poor radar systems onboard. This is even more serious, as it is well known that the weather conditions at times may make certain types of radar sets almost unusable. A radar set can therefore represent a security risk in itself.

If we summarize the various factors influencing the radar, the prementioned increase in the number of vessels, and their speed, it is clearly necessary to stipulate more stringent requirements for the main function of the radar, i.e. to furnish the pilot of a vessel, for example, with the possibility to see what has importance for safe navigation, particularly in bad weather conditions, such as rain, fog, heavy sea, and so forth, and in narrow waters.

Thus there is a considerable need for further technical development of the radar with the object of improving the picture (video) quality.

A number of parameters exist determining the quality of a radar picture. These parameters include the transmitting effect, the length of the pulse, the pulse repetition frequency (PRF), the sensitivity and dynamics of the receiver, the signal processing in the receiver, the signal processing in the display, the type of aerial and its size and rotation speed. These are known conditions which on a technological basis determine the quality of the radar picture.

With reference to the previously known techniques, and problems encumbering todays radar, one shall refer to an article written by Bjorn Hansen and published in "Norsk Nautisk Almanakk for 1993", pages 552–561, entitled "90-årenes navigasjonsradar", and to the U.S. Pat. Nos. 2,817,832, and 4,197,540.

Figure 1:
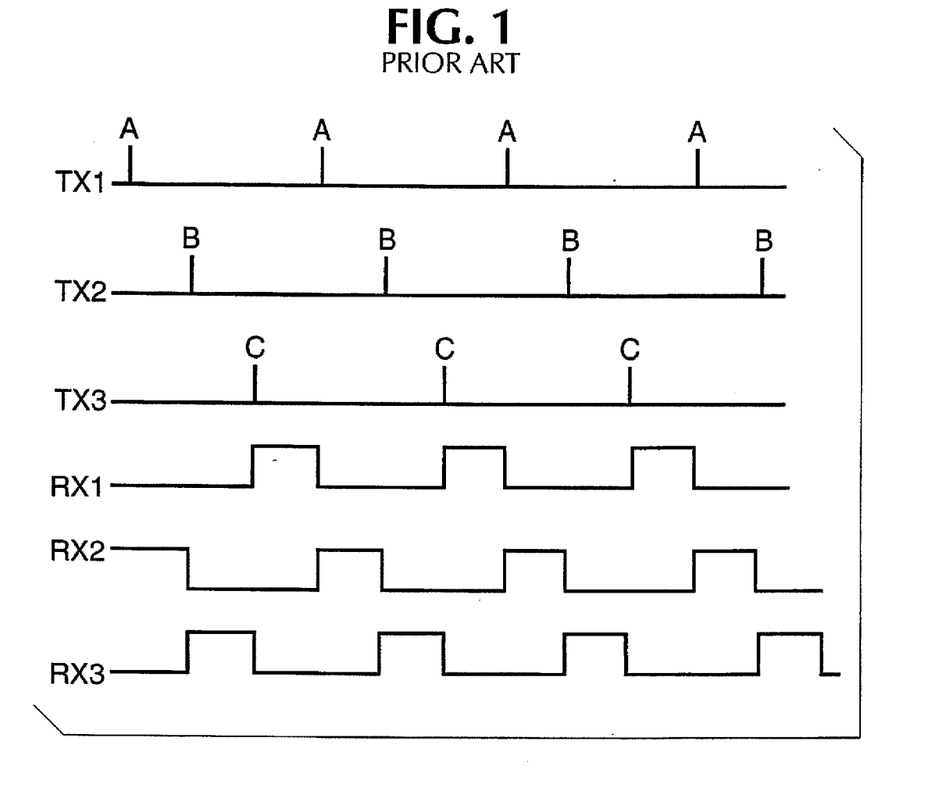
FIG. 1 shows a diagram of the sequence between the transmitters (TX1-TX2-TX3) and the receivers (RX1-RX2-RX3) in accordance with the technical position as stated in U.S. Pat. No. 4,197,540.

U.S. Pat. No. 2,817,832 describes a radar set in which the sequences between the transmitters (TX1-TX2-TX3) and the gated amplifiers 10, 11, 12 and the receiver 16 with which the radar set is constructed are shown in FIG. 1 wherein the upper portion of the figure indicates the order and distance between the transmitter pulses. It will be apparent that the transmitter fires pulses in the mentioned order (TX1-TX2-TX3). The lower portion of the diagram shows the situation of the receiver 16, that is to say the periods of time wherein the receivers are active (open) or closed.

It is evident that the certain receiver (RX) is cut off (i.e. open) during the entire sequence cycle. As mentioned in said patent the individual receiver opens for a limited sequence time only, in that the sequence in the given occasion is only $\frac{1}{3}$ of the sequence time of the respective TX. Furthermore it is stated that the segments are divided into 0–25 NM. It follows therefore that the radar set, according to U.S. Pat. No. 2,817,832, can only see one segment at a time.

If the radar set according to U.S. Pat. No. 2,817,832 manages to increase its total number of transmitters/receivers (TRX) this will lead to the field being even more reduced in relation to the sequence and number of the TRX's.

U.S. Pat. No. 4,197,540 deals with a CW-radar. This proposed radar system could however, not be realized because of the current klystron which could only transmit with limited effect. In the radar sets of the ANSPN-5 type, for example, a system produced by RCA in the USA, a klystron of the type 2-K25, was used. Several klystrons are used in one and the same radar set, and every transmitter includes its own specific receiver. If one looks at the truth table of U.S. Pat. No. 4,197,540 one will find that RX1 will always be closed in the transmitting time of TX1, RX2 will always be closed in the transmitting time of TX2 and so forth. This means that RX1 and RX2 are open, when TX3 transmits, RX2 and RX3 are open when TX1 transmits. Thus, for example, the consequence of this is that if there are, three transmitters, each of the transmitters TX will transmit $\frac{1}{3}$ of a sequence distance. If 6 NM are displayed, for example, the individual TX will transmit the equivalent in time to 2 NM. This means that the RX's will always be turned off sequentially in $\frac{1}{3}$ of a transmitting sequence, that is to say in 2 NM in accordance with the example.

The purpose of the invention is to obtain a new and considerably improved radar compared with those which are known today.

The arrangement of the radar system in accordance with the present invention is characterized by the radar system's transmitter and receiver unit comprising two or more separate transmitters and receivers, that the transmitters and the receivers are triggered by a common trigger, that the common trigger is arranged so as to trigger off each individual transmitter mutually dependent in series during a sequence period, so that the transmitters produce signals with mutually distinct frequencies/characteristics and that the transmitters and receivers are connected to a common aerial, and that the individual receiver is matched to each respective specific transmitter to be able to present the frequencies/characteristics of the video signals in approximately the entire sequence period.

In accordance with a preferred implementation of the radar system according to the invention, each transmitter and the appurtenant receiver forms an independent radar set as part of a system whereby the radar set, without being dependent on the other transmitters and receivers, produces radar signals and receives video signals.

The radar system of the invention, is particularly suitable for the navigation of vessels.

By this connection of two or more individual radar sets where one uses a common aerial one has accomplished the following on the condition that the trigger part circulates the firing of the individual magnetron.

The transmitting effect can be retained, simultaneously as the pulse repetition frequency (PRF) can be increased. In accordance with the invention, each individual transmitter transmits with different frequency. The frequency distance are separated and must equal the minimum bandwidth of the individual receiver, in practice, this is achieved by adding 5 MHZ to maintain good channel separation. Furthermore repeated echoes have always been an enemy to all pulsating radar sets. With the present solution of spreading the frequency for both transmitter and receiver, one can indirectly use repetitive echoes, this relating to the sum of PRF. This means that even if one uses extremely high PRF, one will be able to present a radar picture which "looks" further than the PRF alone could imply.

The pulse length is chosen in relation to the choice of PRF and the aerial's rotation speed. If one transmits with an extremely high PRF it is also advantageous to be able to proportionally reduce the pulse length. This reduction of the pulse length which preferably is effected, gives two possibilities. Firstly, if the relative transmitting effect is retained, the life expectancy of the magnetron will increase correspondingly. The second possibility, if the pulse length is reduced, the effect can increase correspondingly without the life expectancy of the magnetron becoming shorter.

These two points refer to the life expectancy of the magnetron being determined i.a. by the average effect.

In order to explain the invention in greater detail, reference is made to the enclosed diagrams, wherein.

The enclosed FIG. 1 shows a diagram of the sequences between the transmitters (TX1-TX2-TX3) and the receivers (RX1-RX2-RX3) according to the previously mentioned U.S. Pat. No. 4,197,540 of which the radar set is constructed. The diagram will not be referred to further, as it is previously mentioned in this description. It will, however, be referred to in conjunction with a comparison between the corresponding sequence diagram for the radar set according to the present invention.

Figure 2:
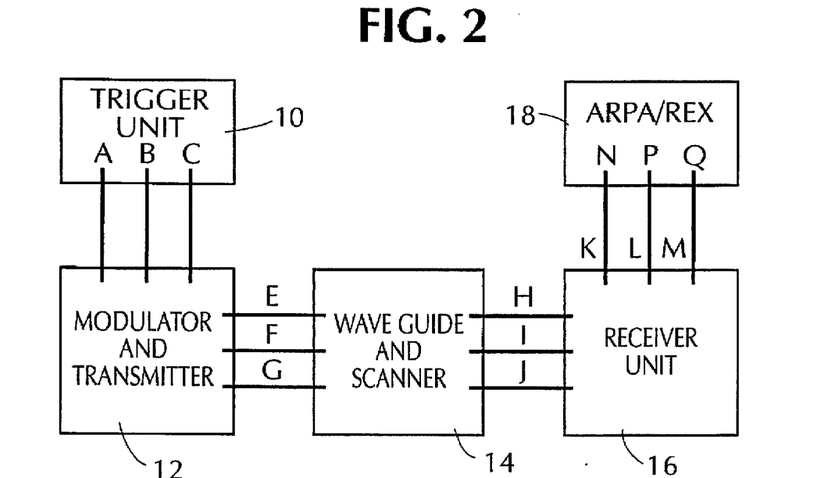
FIG. 2 shows schematic the total layout of the transmitter and receiver part of the radar system according to the invention.

As shown in FIG. 2 the radar system according to the invention, includes a trigger-unit 10, a modulator and transmitter unit 12, an aerial-unit (wave guide and scanner unit) 14, a receiver unit 16 and a signal processing unit 18, preferably of the type ARPA/REX which will be explained later.

Figure 3:
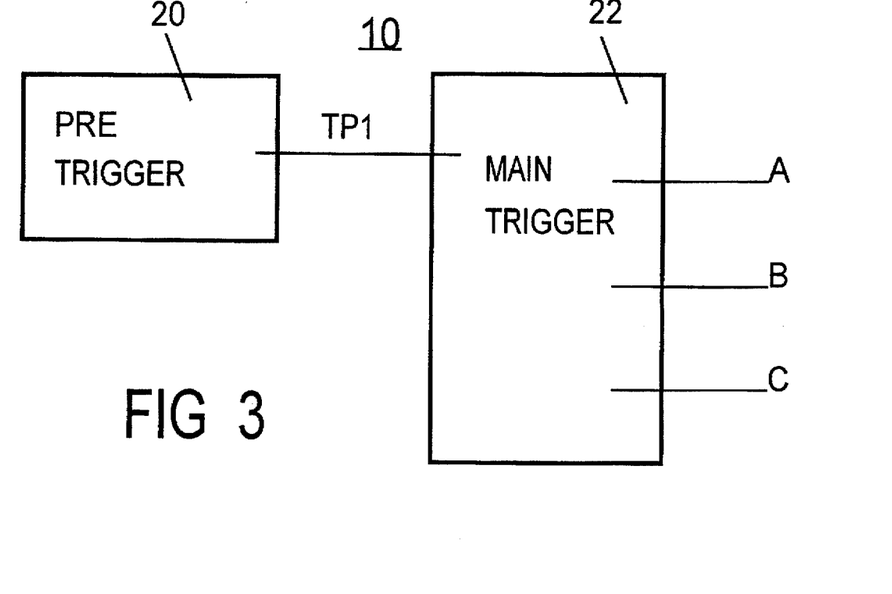
FIG. 3 shows the trigger unit in accordance with FIG. 2.

The explanation of the trigger unit 10 shown in FIG. 3, is based on a specific example where 3 transmitters and 3 receivers are used, and where the pulse repetition frequency PRF is fixed from the aerial and set to 9000 hz (i.e. the PRF is 3000 from each transmitter).

As shown in FIG. 3 the trigger unit 10 includes a pre-trigger 20 and a main trigger 22. The exit TP1 from the pre-trigger 20 can, for example, oscillate with a pulse repetition frequency of 9000 hz as shown diagrammatically in the figure referring to TP1.

The output from the pre-trigger 20 feeds the entrance to the main-trigger 22. The main-trigger 22 divides the distribution will take place in an established sequence. The pulse frequency from the pre-trigger 20 is divided by 3 and gives and out-going pulse frequency for each of the main-trigger outputs 22A, 22B, 22C of 3000 hz, when the PRF equals 9000 hz. Reference is made to the diagram in FIG. 8.

Figure 4:
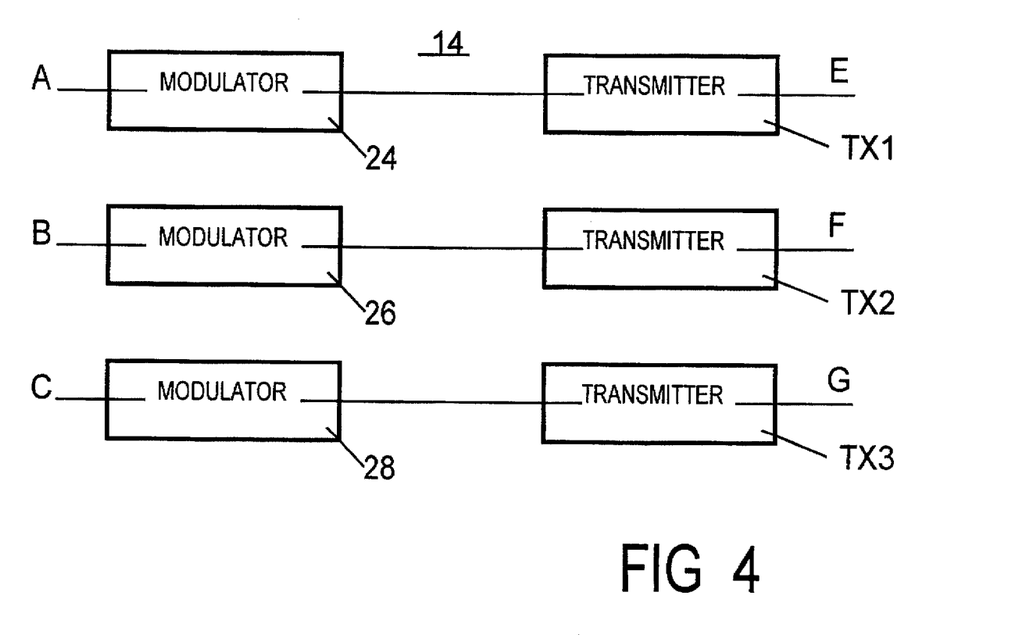
FIG. 4 shows the modulator and transmitter units in accordance with FIG. 2.

The explanation of the transmitter-unit 12 which is shown in FIG. 4 is based on the use of the three transmitters TR1, TR2, TR3 as shown in FIG. 3. The transmitter unit 14 comprises three modulators 24, 26, 28 and three transmitters TR1, TR2, TR3. Each of the three modulators 24, 26, and 28 is connected to an individual transmitter TX1,TX2,TX3. The exits E,F,G from the transmitters are connected to a common aerial through respective circulators S1, S2, and S3 in the aerial unit 16 (see FIG. 6). The out-going frequencies from the transmitters differ in relation to each other. The pulse repetition frequency PRF and the sequence to the aerial correspond with the exit signal A,B,C produced by the trigger-unit.

Figures 5, 5A:
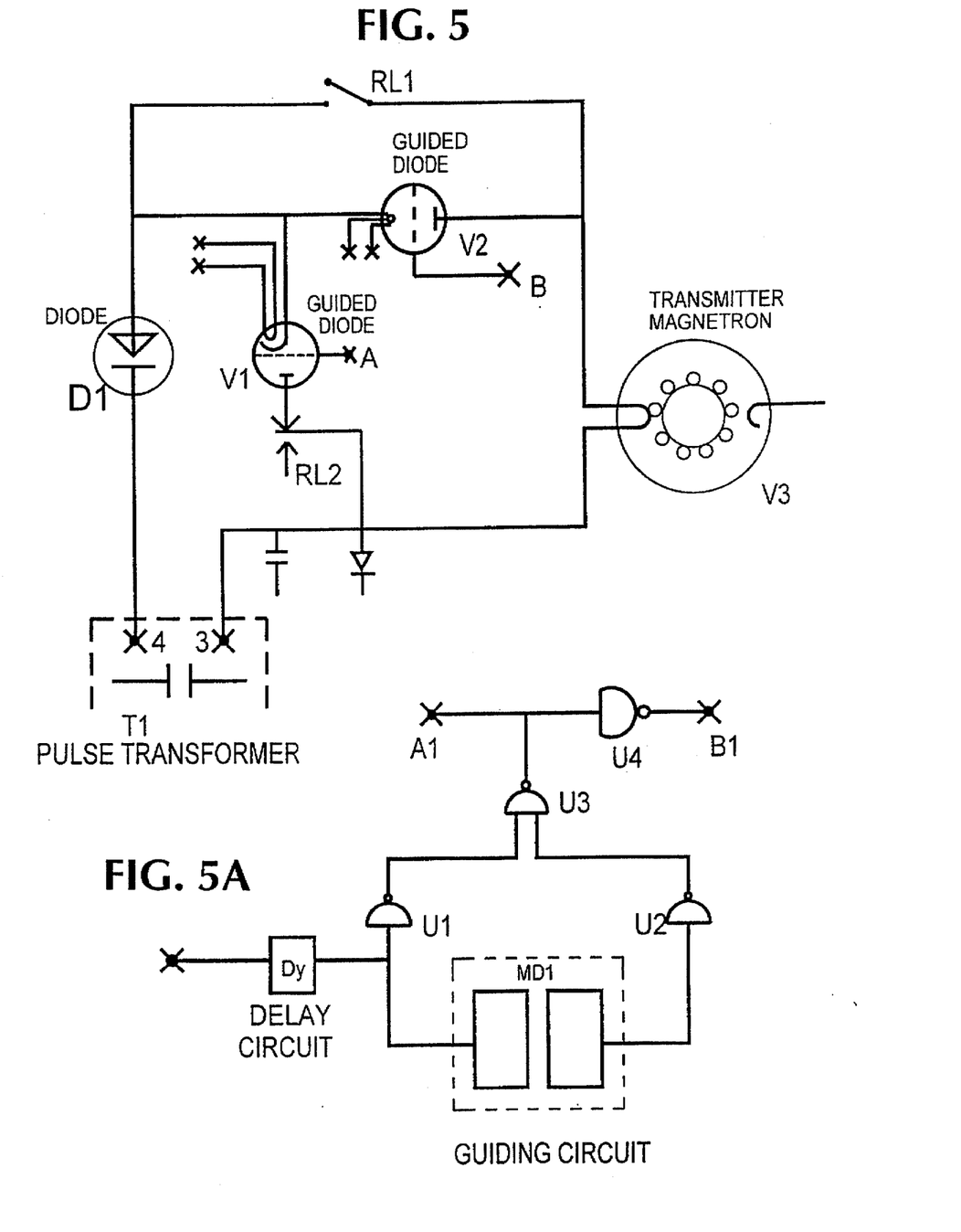
FIG. 5 shows a specific embodiment of the pulse shaper unit of the transmitter unit.
FIG. 5a illustrates a guiding circuit for the pulse-shaper unit of FIG. 5.

Reference is made to FIG. 5 which shown a specific embodiment of the pulse-shaper unit of the transmitter-part in the radar system of the invention.

The coupling of FIG. 5 which shows a specific embodiment of the pulse-shaper unit of the transmitter-part in the radar system of the invention.

The coupling of FIG. 5 represents each of the transmitter parts TX1–TX3 in FIG. 4. The entrance represents a pulse-transformer T1, whilst the output comprises a transmitter magnetron V3. Between a point 4 of the pulse-transformer T1 and the cathode entrance on the magnetron V3, a diode D1 is coupled in series with a relay RL1. The cathode of diode D1 is coupled to the pulse-transformer T1. A guided diode V2 is coupled in parallel with the relay RL1 which may comprise a triode, a tetrode or a thyristor. This diode V2 has its anode facing the magnetron V3 whilst the cathode faces the anode of the diode D1. An additional guided diode V1 is coupled between the V2 diode's cathode and a point 3 on the pulse-transformer T1, on the earth side of the magnetron (cathode), the V1 and V2 cathodes are coupled together. A relay RL2 is coupled to the anode of V1.

The notion for guiding the two diodes V1,V2, is that the given pulse from the pulse-transformers T1 will either lead through V2 to the cathode of magnetron V3, or be diverted via V1 to earth. Guiding takes place by means of a separate guiding circuit as shown in FIG. 5a which includes a delay circuit DY, NAND-gates U1,U2,U3 and U4, as well as a multivibrator and variable delay gate MD1 with a time set of from 5 to 40 nanoseconds (ns). The guiding circuit is connected as follows: the output from the delay circuit DY branches off and leads to the entrance of NAND-gate U1 and entrance MD1, respectively (multivib./variable delay gate port). The output of the MD1 is carried forward to the entrance of NAND-gate U2. NAND-gates U1 and U2 are carried forward to their own separate entrance in NAND-gate U3. The output from U3 branches off the connecting point A1 and entrance NAND-gate U4, respectively. The exit from U4 is carried forward to the connecting point B1. The connection points A1 and B1 are connected between the grids of the diodes V1 and V2 via the connecting points A and B as shown in FIG. 5.

The adjustment of a transmitted signal pulse to the magnetron V3 takes place as follows:

In Rest Position

The exit DY and MD1 is logically 1. The output U1 and U2 are logically 0. The output U3 is logically 1. The exit U4 is logically 0. That is to say that A1 hold A positive and V1 is saturation, whilst V2 is cut off.

Explanation

The positive trigger into DY for DY's output negative after 5–10 ns. MD1 has an inner delay 0–40 ns. and maintains MD1 output in the delay time logically 1.

Situtation 1

After DY's output has become negative, the U1 output becomes positive and makes A1 negative and B1 positive. V1 cuts off and V2 becomes saturated.

Situation 2

After completion of situation 1, the delay time of MD1 will make the output U2 positive. This results in A1 becoming positive and B1 becoming negative. This means that V1 becomes saturated and V2 cuts off. MD1 will not change its logical state before it has reached 500 ns. DY is reset when the trigger has become negative.

The switch system outlined in FIG. 5 will function as follows, guided by the circuit shown in FIGS. 5a. The positive moving pulse entering into the pulse-transformer builds up point 4 negative. We ensure that in the elapsed time period to build up the negative voltage in point 4, point 3 is linked to point 4. The tetrode V2 is at the same time cut off and keeps the magnetron shut out from the circuit. At the moment point 4 of the pulse transformer has attained its maximum negative voltage, V1 switches to cut off and simultaneously V2 becomes saturated. The negative-moving pulse that is now being led into the magnetron has extremely steep leading edges (the steepness is measured to less than 5 ns). For the pulse which is now led into the magnetron having the shortest possible duration (adjustable from 30 to 10 ns) it is imperative that the tetrodes are restored to their normal positions within the stated time. This is because the transmitter pulse should finish with the steepest possible leading edge (Example - for tetrode choice for a transmitter effect up to 35 KW (nominal effect 4CW 25,000A). However, since the nominal effect is considerably less, much cheaper tubes/thyristors can be used. Normally this would involve effects from 45–100 W nominal effect in a relatively powerful navigational transmitter.

It is possible that the pulse length can be decreased by less time than previously mentioned, by using the same coupling of triodes, tetrodes or thyristors as shown in FIG. 5, but differ in that switches are substituted with primed-TR-cells. The switching itself must take place in the waveguide. The switching then occurs between the aerial and a dummy-load. This solution may give pulse lengths of a duration of down to 4–5 ns. The gain would be of little use. This type of coupling is also expensive as it requires expensive solutions for the construction and composition of the wave-guide.

Figure 6:
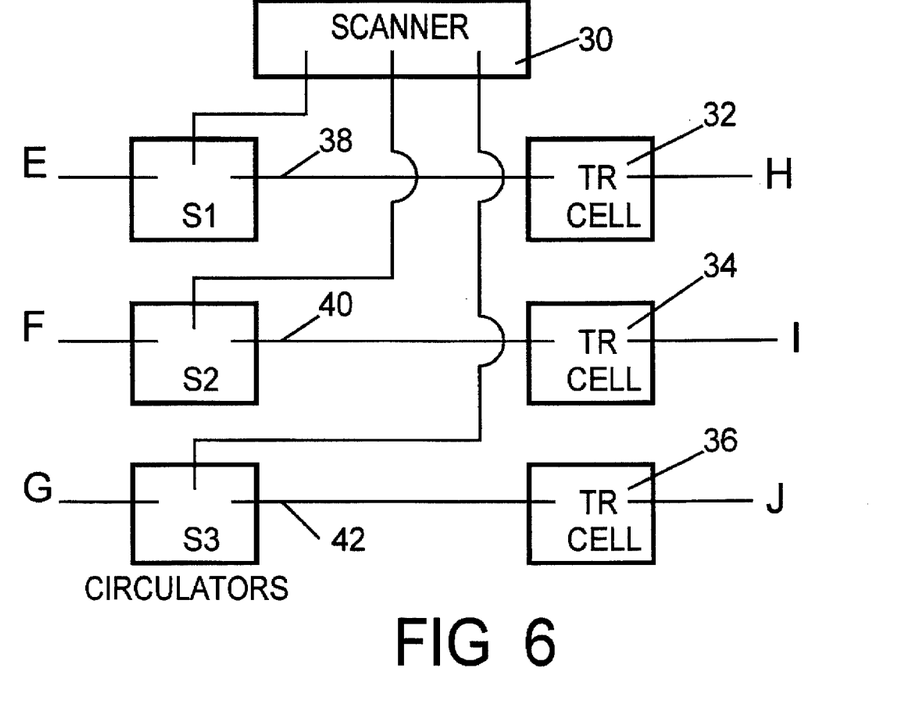
FIG. 6 shows the wave guide and scanner units in accordance with FIG. 2.

The explanation of the aerial unit (the wave-guide and scanner-unit 14) which is outlined in FIG. 6, is related to the example with three transmitters TR1,TR2,TR3 in FIG. 3 and the three respective receivers RX1, RX2, RX3. The signals E, F, G from the transmitters TX1, TX2, TX3 are fed to the scanner 30 through the circulators S1, S2, S3. The sequence and the PRF from the scanners are the same as the output from the transmitter unit. The TR-cells 32, 34 and 36 are closed (cut off) in unison with the PRF, in that the these signals are transmitted via their respective connections 38, 40 and 42. This means that all TR-cells are cut off simultaneously, i.e. in the time span as the transmitter transmits signals to the scanner 30.

For the aerial one can use either a parabolic aerial, or a slotted wave guide. On a purely technical basis the parabolic aerial is better than the slotted wave guide. On the other hand, the very best alternative would be a totally parabolic aerial. A totally parabolic aerial can only transmit and receive in a limited vertical and horizontal area (pencil beam). There is a considerable advantage in channelling most of the power in a thin circular beam. This means that a relatively low cloud covering with a relatively high rain content will not affect the functioning of the radar. Another benefit is that one can use all advantages with regard to polarization technology as a means of a clutter function and to a certain extent, as a remedy against interference/ jamming. On the other hand, this type of aerial would be very expensive as it must be gyro-stabilized at all levels. This solution is better suited for military purposes.

The receiver unit 16 (see FIG. 7) is made up of three separate receivers RX1, RX2 RX3 each of which is connected to a respective TR-cell 32,34,36 (see FIG. 6) of the common aerial unit 14 via connections H, I, and J. The receivers RX1, RX2, RX3 are syntonized in frequencies corresponding to their respective transmitters. However the frequency dispersal, that is to say the distance between the receivers (on account of the frequencies given out by the transmitters) is so large that the receiver only "sees" video signals from its own specific transmitter.

According to the invention it is preferred that each receiver feeds an individual radar-extractor (ARPA). In accordance with the most preferred implementation of the invention, the receivers are simultaneously coupled to a common extractor. This, so as to utilize the potential that lies in the added quantity of information inherent in this construction.

As one, in accordance with the invention uses high transmitter effects, the signal processing in the receiver part, should start as soon as possible. This means that signal processing should start in or just after the TR-cell. This is, so as to avoid driving the receiver into saturation from echoes entering from relatively closely situated objects. Since the transmitter pulse has an extremely steep leading edge of the transmitting pulse itself, the TR-cells should be primed. This is also because, in this case, the switching in a TR-cell operates too slow, (we refer to the characteristics of a TR-cell).

Figure 8:
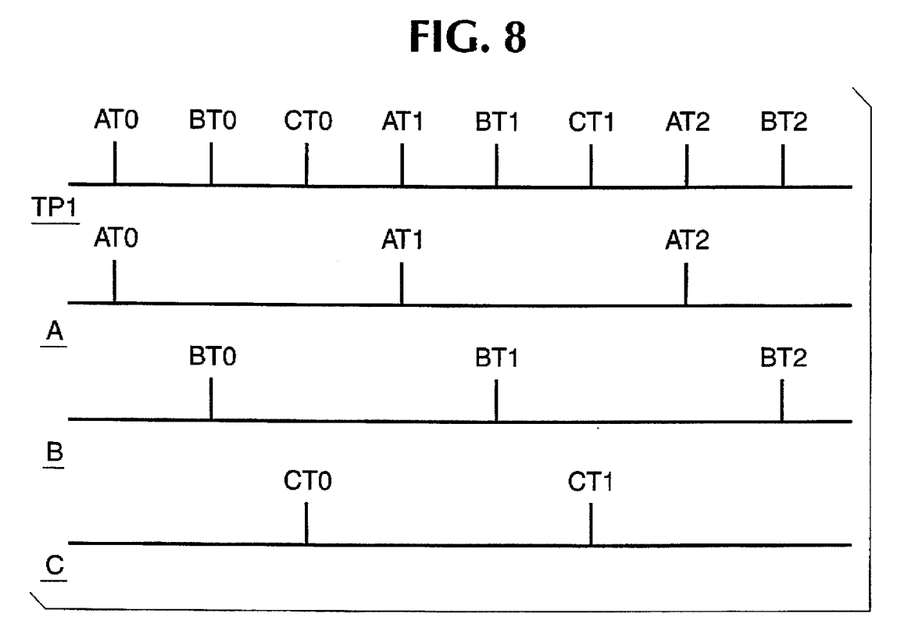
FIG. 8 shows the sequence-diagram for the pulse sequence outlet from the pre-trigger 20 and the main trigger 22 in accordance with FIG. 3.

If now the rotation of the aerial is caused to stop and one analyses the video signal exit from each individual receiver RX,RX2,RX3, the following will be seen: the video signal from RX2 is delayed in relation to RX1. The video signal from RX3 is delayed in relation to RX2. The delay is in accordance with the aforementioned sequence, as described in the truth-table in FIG. 8. FIG. 8 shows the sequence diagram of the pulse sequence exit from the pre-trigger 20 and the main trigger (as in FIG. 3.). The top line in FIG. 8 shows TP1, i.e. the pattern for the total pulse transmittance from the transmitter unit 14, while the three bottom lines show the pulse transmittance from each of the individual transmitters A, B, and C. The index numbers 0, 1, 2 . . . , show the pulse number from each of the transmitters. The pulse transmittances are indicated with upward directed lines.

Figure 9:
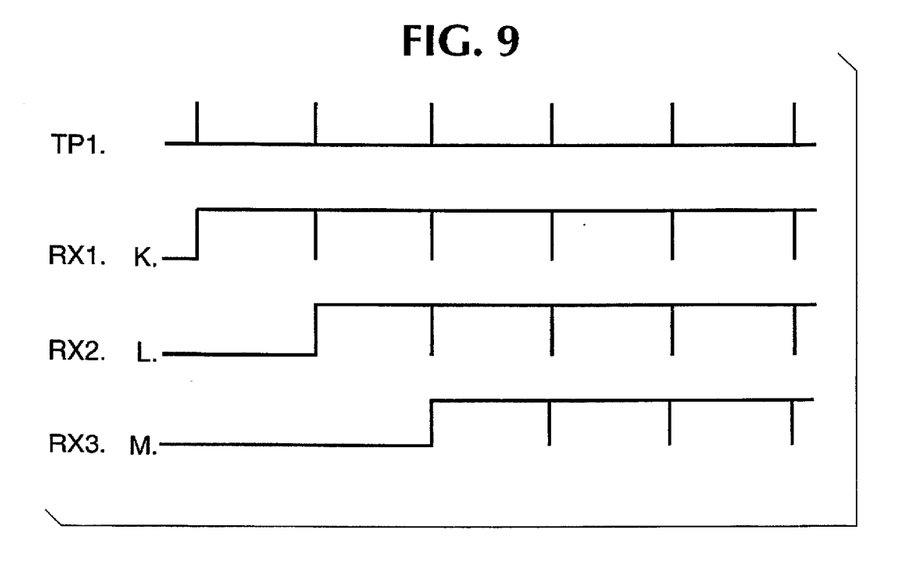
FIG. 9 shows the sequence-diagram for the pulse sequence inlet to the receiver unit.

FIG. 9 shows the sequence diagram for the pulse sequence entrance of the pulses RX1 K., RX2 L. and RX3 M to the receiver unit. The top line of the figure shows TP1, i.e. the sequences for the delivered signals from the transmitter as shown in FIG. 4. (see also FIG. 8). The bottom three lines show the opening sequences as well as the closing (cut off) of the receivers for the reception of the pulses during the time period where the transmitters emit pulses considered in relation to TP1. After an introductory starting period one sees that all the receivers are open, except for the period where the transmitters produce pulses. The cut off is indicated by vertical lines. The diagram shows in greater detail that RX1 K (receiver RX1 K opens first in the consecutive order of the receivers. This opening takes place when RP1 produces the first pulse. The opening of the receiver RX1 occurs, therefore, at the same moment as the transmitter TX1 has emitted its transmitter pulse.

When pulse number 2 arises in TP1, the receiver RX1 closes (simultaneously TX2 starts transmitting). When the transmitter TX2 has transmitted its transmitter pulse the receivers RX1 and RX2 open this means that the receivers RX1 and RX2 receive video signals simultaneously, but the video signals which are supplied to the receiver, are displaced with respect to time corresponding to the elapsed time between the first and second pulses given by TP1 (⅑₀₀₀ sec.)

When sequence pulse number 3 in TP1 arises, the receivers RX1 and RX2 close (simultaneously TX3 starts transmitting). When the transmitter TX3 has transmitted its transmitter pulse all receivers open. This means that the receivers receive video signals simultaneously, but the video signals which are supplied to the receiver, are displaced with respect to time. The time between the second and third pulses given b TP1 (⅑₀₀₀ sec) determines the time difference between the video signal arising in the receivers RX2 and RX3.

Figure 7:
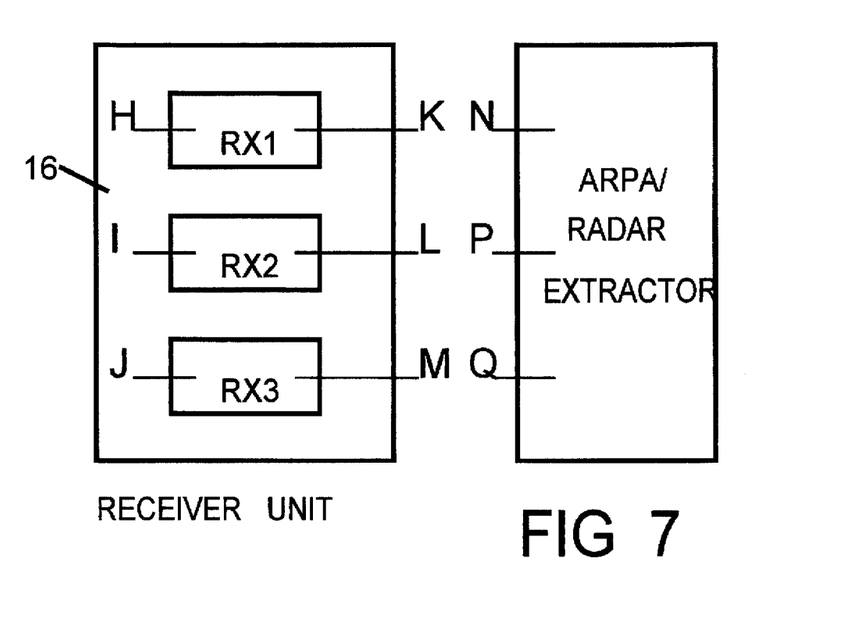
FIG. 7 shows the receiver unit in accordance with FIG. 2.

As shown in FIGS. 7 and 9, we have the same video signal in all the receivers, but the video signals are displaced with respect to time, equivalent to the given example PRF of 9000 hz. Furthermore we see that the receivers are closed (cut off) corresponding to the PRF of 9000 hz. The point in time for the cut off of the receiver corresponds with the closed state of the TR-cells 32,34,36 (FIG. 6.). It is undesirable that this closed state arises at the same time related to AT0 (the first pulse from A), AT1 (the second pulse from A), AT2 (the third pulse from A), etc. In order to avoid this, it will according to the invention, be expedient to wobble the trigger outputs from the main trigger in relation to each other. The variation time from the main trigger should be larger than the receivers cut off time.

The reason why it may be expedient to effect said wobbling, is that the ARPA/radar extractors should have the best conditions possible to be able to see optional objects in the field, which would be "blind" if the trigger pulses were completely synchronized in relation to each other. When the multiple echoes are presented on a display, one or a plurality of areas will be without any information. The width of the field is, however, not greater than the transmitter pulse duration. In practice this means that one will have a circle without any information which constitutes the minimum of 1 microsecond ms. The explanation for this lies in the TR-cells relatively slack flank after the keep alive voltage and/or the transmitting pulse has ceased. This "blind" field can be avoided to a certain extent by wobbling the PRF between the individual transmitters.

The off-centering can be brought about and used in a completely different way than earlier. As mentioned previously the radar picture will have a multiplied density of information. For example, this permits off-centering out to 6 NM, at the same time as the radar screen scale is set to 0.25 NM. By using two separate displays many possibilities and applications exist. One can for example, "zoom" into an area that requires closer attention, and at the same time as valuable information around ones own vessel, is available.

One may for example, allow the radar extractor (ARPA) to be fed with information exclusively from the zoomed-in area. By leaving the extractor to function automatically it will be able to automatically signalize, of any occurring movement in the zoomed area.

An ARPA/radar extractor is a computer in which video signals are processing digitally and which in this way may sample the signals, i.e. calculate course, speed, and angle speed. The conditions for the parameters may be changed both manually and automatically. This signal processing technology is well known.

If we isolate the TRX units from each other, they may be considered as individually independent radar units, and function as such. The manner in which the system mutually work does not differ from other radar units where the same coupling is given in a comparable block diagram. This is conditional upon the current TRX being conveyed to the trigger.

If we examine the block diagram as a whole, the principle mode of operation of the individual TRX is still the same as other radar units.

The feature which makes the coupling particularly special is the cooperation carried out by the individual TRXs. Said cooperation between the TRX's is distributed by the trigger. The sum total of information that derives from the RX's is the result of this cooperation.

A. The triggers output trigger each individual transmitter in predetermined sequences.

B. PRF is set to 3000 (based on one transmitter).

C. The sequence effects a delay of the individual TRX with regard to time which corresponds to ⅓ of the PRF, in relation to each other.

D. There are three receivers and transmitters.

As the circuit has only one common aerial, the example will give us a PRF of 9000 fixed from an aerial. Since the transmitters mutually do not work at the same frequency there is a corresponding frequency deviation of the receivers. The receivers are syntonized to their respective transmitters.

If we fulfill the previously mentioned parameter we will have a radar set operating with a PRF of 9000 (fixed from an aerial) but the choice of scale for the radar set will be comparative with a radar set which operates with PRF of 3000. This results in a threefold increase in the amount of information.

Some Areas of Use.

The construction of a radar set, as described in the present invention has clear advantages over the more current radar set construction. As the detection range of the radar set neither relies on, or is determined by the pulse repetition frequency PRF, it also indirectly solves other important parameters. The rotation speed of the aerial is partly PRF dependent. This means that by increasing the PRF, the relative rotation speed of the aerial may also be increased. This increase in PRF and rotation speed of the aerial will on a technical basis, increase the amount of video-information. This situation with increased PRF and increased aerial rotation gives two considerable advantages for an ARPA/REX.

The first advantage relies in the fact that one obtains a relative increase of pulse to pulse correlation.

The second advantage is that one obtains a relative increase of scan to scan correlation.

These advantages determine the possibilities of the ARPA/REX to update a radar picture with speed and precision. It has been demonstrated in trials that the speed of a target, and a deviation of both velocity and angle-speed could be registered with an improved time from 60 seconds (with an ordinary radar) and down to 2–4 seconds (for the disclosed radar in accordance with the invention). (These points apply to given specific conditions and specific characteristics and should therefore be considered as relative values).

For safe navigation, where vessels operate in relatively high speeds, it can be asserted, on a purely technical level, that this construction of radar set will represent a considerable improvement. Said radar construction will produce a radar picture to a navigator which both in terms of time and video information, is far more correct than earlier.

On the other hand said radar construction may be adapted to comply with "The International Maritime Organization" (IMO) requesting vessels over a certain size having a minimum of two radar sets. This is achieved by using two parallel aerials where the switching between the aerials is effected mechanically in wave guide. This is more economical related to the request for two radar sets, and at the same time one may retain the technical improvements of the video information.

By relatively increasing the PRF and the rotation speed of the aerial, it can be advantageous to shorten the length of the pulse compared with an ordinary radar.

By connecting two or more transmitters and receivers to a common aerial where the transmitters transmit with different frequencies, as in accordance with the invention, the following can be achieved:

A: No essential loss of transmitter effect.

B: Extremely high PRF, for example 8000–16000 pulses per second.

C: No reduction of the theoretical range.

D: If point B is utilized it could be expedient to reduce the pulse length (down to, and less than or equal to 12.5 ns.) This decrease of the pulse length involves a positive effect on the average output supply of the transmitter.

As a consequence of high PRF, the rotation of the aerial should be variable form 30 to 60 rpm. In practice it has been shown that aerial rotation of 45–55 rpm involves great positive consequences for the picture presentation and the work environment of an ARPA display.

The construction in itself opens up the possibility of increasing the amount of information to the display in threefold (depending upon the number of interconnected units). The TRx's may operate separately so as to satisfy requirements and request for two or more radar sets.

It should be appreciated that one is not limited to the establishment of three transmitters as shown in the present example according to FIGS. 2 and 4. That is to say, the expression "two or more" as it is applied here means that 2, 3 or any greater number of transmitters can be used in the radar system. This depends entirely on what is deemed to be most appropriate and practical.

I claim:

1. A radar system for transmitting and receiving radar signals, said system comprising;

a transmitter unit having at least two transmitters;

a receiver unit having at least two receiver, each receiver being syntonized to a respective transmitter;

a common trigger unit for triggering off said transmitters and receivers, a common aerial unit for transmitting radar signal from said transmitting unit and for receiving and directing reflected video signals to said receiver unit; and a signal processing unit connected to said receiver unit to process video signals received from said receiver unit in a pulse-to-pulse correlation with said receivers in said receiver unit, characterized in that each transmitter and corresponding receiver form a self-contained radar set independent of the other transmitters and receivers;

that each transmitter is prepared to trigger off in series during a sequence period with the period between each transmitted pulse being equal; and that each said receiver is matched to a respective transmitter to present frequencies/characteristics of video signals in approximately the entire sequence period.

2. A radar system in accordance with claim 1 characterized in that said receivers are arranged to be open for receiving video signals in the total sequence period with the exception of the time periods when each transmitter transmits.

3. A radar system in accordance with claim 1 or claim 2 characterized in that each transmitter has a magnetron arranged to transmit with a different frequency from the magnetron of the other of said transmitters.

4. A radar system in accordance with claim 3 characterized in that the distance in frequency between the signals from each magnetron corresponds at last to the bank width of a respective receiver plus 5 MHz.

5. A radar system in accordance with claim 3 characterized in that said common trigger unit is arranged to trigger off each transmitter mutually in series during a sequence period, so that said transmitters produce signals with mutually distinct frequencies/characteristics.

6. A radar system in accordance with claim 1 characterized in that said trigger unit triggers off said transmitters in a circular cyclic sequence.

7. A radar system in accordance with claim 1 characterized in that said aerial unit includes at least two TR-cells, each TR-cell being connected to a respective receiver to deliver a video signal thereto and said TR-cells being closed when said transmitters transmit signals to said aerial unit.

8. A radar system in accordance with any of the proceeding claims characterized in that said signals of the transmitters are wobbled.

9. A radar system in accordance with any of the proceeding claims characterized in that the length of each transmitted pulse from said trigger unit is adjustable from 30 to 10 ns, and that said trigger unit is arranged to oscillate with a pulse repetition frequency of from 8000 to 16000 hz.

10. A radar system in accordance with claim 9 wherein said pulse repetition frequency is 9000 hz.

11. A radar system in accordance with claim 1 wherein said signal processing unit includes a common extractor connected to said receivers to process and display said video signals.

12. A radar system in accordance with claim 1 wherein said signal processing unit includes at least two extractors, each extractor being connected to a respective to process and display a video signal therefrom.

* * * * *

UNITED STATES PATENT AND TRADEMARK OFFICE
CERTIFICATE OF CORRECTION

PATENT NO.  : 5,663,730
DATED       : September 2, 1997
INVENTOR(S) : Per-Arne Isaksen It is certified that error appears in the above-identified patent and that said Letters Patent is hereby corrected as shown below:

Column 4, lines 28 to 30, cancel "The coupling ... of the invention."

Column 5, line 39, cancel ")"

Line 43, after "transmitter." insert -)-

Column 9, line 58, change "two receiver" to -two receivers-

Line 62, change "signal" to -signals-

Column 10, line 62, after "respective" insert -receiver-

Signed and Sealed this

Thirtieth Day of December, 1997

Attest:

BRUCE LEHMAN

Attesting Officer

Commissioner of Patents and Trademarks